United States Patent
Fukunaga et al.

(10) Patent No.: US 9,403,242 B2
(45) Date of Patent: Aug. 2, 2016

(54) STEEL FOR WELDING

(75) Inventors: Kazuhiro Fukunaga, Tokyo (JP); Yoshiyuki Watanabe, Tokyo (JP); Shinsuke Usui, Tokyo (JP); Rikio Chijiiwa, Futtsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/356,422

(22) PCT Filed: Jun. 29, 2012

(86) PCT No.: PCT/JP2012/066674
§ 371 (c)(1),
(2), (4) Date: May 6, 2014

(87) PCT Pub. No.: WO2013/077022
PCT Pub. Date: May 30, 2013

(65) Prior Publication Data
US 2014/0328716 A1    Nov. 6, 2014

(30) Foreign Application Priority Data

Nov. 25, 2011  (JP) ................... 2011-257688

(51) Int. Cl.
*C22C 38/04* (2006.01)
*B23K 35/30* (2006.01)
(Continued)

(52) U.S. Cl.
CPC .............. *B23K 35/3073* (2013.01); *B23K 9/18* (2013.01); *B23K 9/23* (2013.01); *C21D 8/0226* (2013.01); *C21D 8/0263* (2013.01); *C21D 9/46* (2013.01); *C22C 1/02* (2013.01); *C22C 38/001* (2013.01);
(Continued)

(58) Field of Classification Search
CPC .......... C22C 38/02; C22C 38/04; C22C 38/14
See application file for complete search history.

(56) References Cited

U.S. PATENT DOCUMENTS

| 5,985,053 A | 11/1999 | Hara et al. |
| 6,866,725 B2 | 3/2005 | Fujita et al. |

(Continued)

FOREIGN PATENT DOCUMENTS

| CA | 2231985 | 9/1998 |
| CA | 2429439 | 11/2003 |

(Continued)

OTHER PUBLICATIONS

English machine translation of JP2006-124759A of Okazaki et al., May 18, 2006.*

(Continued)

*Primary Examiner* — Roy King
*Assistant Examiner* — Jophy S Koshy
(74) *Attorney, Agent, or Firm* — Kenyon & Kenyon LLP

(57) ABSTRACT

A steel for welding includes steel components in which $P_{CTOD}$ is less than or equal to 0.065%, CeqH is less than or equal to 0.225%, FB is greater than or equal to 0.0003%, and Bp is 0.09% to 0.30%. In the steel for welding, in a thickness center portion of a cross-section in a thickness direction, the number of oxide particles having an equivalent circle diameter of 2 μm or greater is less than or equal to 20 particles/mm$^2$ and the number of Ti oxides having an equivalent circle diameter of 0.05 μm to 0.5 μm is $1.0\times10^3$ particles/mm$^2$ to $1.0\times10^5$ particles/mm$^2$.

8 Claims, 1 Drawing Sheet

(51) Int. Cl.

| | | |
|---|---|---|
| *C22C 38/58* | (2006.01) | |
| *C22C 38/54* | (2006.01) | |
| *C22C 38/50* | (2006.01) | |
| *C22C 38/48* | (2006.01) | |
| *C22C 38/46* | (2006.01) | |
| *C22C 38/44* | (2006.01) | |
| *C22C 38/42* | (2006.01) | |
| *C22C 38/14* | (2006.01) | |
| *C22C 38/12* | (2006.01) | |
| *C22C 38/08* | (2006.01) | |
| *C22C 38/06* | (2006.01) | |
| *C22C 38/02* | (2006.01) | |
| *C22C 38/00* | (2006.01) | |
| *C22C 38/60* | (2006.01) | |
| *C21D 8/02* | (2006.01) | |
| *C21D 9/46* | (2006.01) | |
| *C22C 1/02* | (2006.01) | |
| *B23K 9/18* | (2006.01) | |
| *B23K 9/23* | (2006.01) | |

(52) U.S. Cl.
CPC ............ *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *B23K 2203/04* (2013.01); *C21D 2211/004* (2013.01)

(56) References Cited

U.S. PATENT DOCUMENTS

| | | | |
|---|---|---|---|
| 8,668,784 B2 | 3/2014 | Watanabe et al. | |
| 8,920,713 B2 | 12/2014 | Watanabe et al. | |
| 2010/0078097 A1 | 4/2010 | Yoshida et al. | |
| 2010/0319814 A1* | 12/2010 | Perez et al. | 148/506 |

FOREIGN PATENT DOCUMENTS

| | | |
|---|---|---|
| CA | 2602076 | 6/2008 |
| DE | 60108350 | 12/2005 |
| EP | 1143023 | 10/2001 |
| EP | 1221493 | 7/2002 |
| EP | 2236631 | 10/2010 |
| EP | 2385149 | 11/2011 |
| EP | 2400041 | 12/2011 |
| JP | 07-278653 A | 10/1995 |
| JP | 09-001303 | 1/1997 |
| JP | 09-157787 A | 9/1997 |
| JP | 09-310147 | 12/1997 |
| JP | 2000-096139 A | 4/2000 |
| JP | 2001-323336 A | 11/2001 |
| JP | 2005-171300 | 6/2005 |
| JP | 2006-124759 | 5/2006 |
| JP | 2007-002271 | 1/2007 |
| JP | 2007-211334 | 8/2007 |
| JP | 2008-163446 A | 7/2008 |
| JP | 2008-169429 A | 7/2008 |
| JP | 2010-248590 | 11/2010 |
| RU | 2152450 | 7/2000 |
| RU | 2198771 C2 | 2/2003 |
| RU | 221877 C2 | 9/2003 |
| RU | 2235792 | 9/2004 |
| WO | WO 01/59167 | 8/2001 |
| WO | 2009/072663 A1 | 6/2009 |
| WO | WO 2009/072559 | 6/2009 |
| WO | WO 2010/134323 | 11/2010 |
| WO | WO2010/134353 | 11/2010 |

OTHER PUBLICATIONS

International Search Report dated Sep. 18, 2012 issued in corresponding PCT Application No. PCT/JP2012/066674 [with English Translation].
Notice of Allowance dated Sep. 9, 2015 issued in corresponding Russian Application No. 2014120754 [with English Translation].
European Search Report dated Oct. 8, 2015 issued in corresponding European Application No. 12851373.6.
Office Action issued on Oct. 4, 2011 in a corresponding U.S. Appl. No. 13/138,119.
Office Action issued on Oct. 11, 2011 in a corresponding Canadian application No. 2,749,154.
International Search report issued on Aug. 10, 2010 in a corresponding PCT application No. PCT/JP2010/003344.
Notice of Allowance issued on Mar. 2, 2012 in a corresponding Russian Application No. 2011129331.
European Search report issued on Jun. 19, 2012 in a corresponding PCT application No. 10777561.1.
Office Action issued on Mar. 30, 2015 in a corresponding U.S. Appl. No. 14/075,342.
Final Office Action issued on Oct. 9, 2015 in a corresponding U.S. Appl. No. 14/075,342.

* cited by examiner

STEEL FOR WELDING

CROSS-REFERENCES TO RELATED APPLICATIONS

This application is a national stage application of International Application No. PCT/JP2012/066674, filed Jun. 29, 2012, which claims priority to Japanese Patent Application No. 2011-257688, filed on Nov. 25, 2011, each of which is incorporated by reference in its entirety.

TECHNICAL FIELD OF THE INVENTION

The present invention relates to a steel for welding having a high CTOD property of a heat affected zone (HAZ) during small heat input welding to medium heat input welding; and a method of producing the same. In particular, the present invention relates to a steel for welding having high CTOD property of a heat affected zone, in which CTOD property of FL (a fusion line), that is, a boundary between a weld metal (WM) and a heat affected zone (HAZ) and IC zone (an intercritical HAZ zone), that is, a boundary between the HAZ and a base material (BM), where toughness most significantly deteriorates during small heat input welding to medium heat input welding, are superior.

RELATED ART

Recently, along with the development of cold regions or the like, a steel used in a harsh environment has been required. For example, a high-strength steel suitable for a steel structure such as an offshore structure which is used in cold regions such as the Arctic or an earthquake-resistant building is required. In the above-described steel used in cold regions, a requirement for a crack tip opening displacement (CTOD) property, which is an index of fracture toughness, is higher than that of a steel of the related art. In both a base material and a heat affected zone, a high CTOD property is required.

The CTOD property of the heat affected zone (HAZ) is evaluated in a test where notches are formed at two positions including the FL and the IC zone. However, currently, in most cases, only the FL has been a target for improvement of the CTOD property.

The reason is presumed to be that, under a condition where a test temperature is less harsh (for example, about −10° C.), if the CTOD property of the FL is satisfied, the CTOD property of the IC zone is sufficient.

However, it was found that, under a harsh test condition of −80° C. which is required for steel used in cold regions such as the Arctic, there is a problem in that the CTOD value of the IC zone, which has caused no problem even without being considered, is low. Therefore, a technique of improving both the CTOD property of the FL and the CTOD property of the IC zone is required.

For example, Patent Document 1 discloses a technique capable of obtaining a high CTOD property in a welded joint during small to medium input welding under a test condition of −60° C. However, the CTOD property of the IC zone is not disclosed.

Patent Document 2 and Patent Document 3 disclose a technique of securing a CTOD property in an environment of −60° C. by satisfying parameters of $P_{CTOD}$ and CeqH in consideration of not only the FL but the IC zone. However, the present inventors found that, when the CTOD property at −80° C. of steel produced based on this technique was investigated, the required property was not satisfied. Further, as a result of a detailed investigation on the correspondence relationship between the CTOD property of a practical welded joint at −80° C. and the results of a simulated thermal cycle test, it was found that, in order to satisfy the CTOD property of the practical welded joint at −80° C., $T\delta_C 0.1$, which is the lower limit temperature at which the limit CTOD value is greater than or equal to 0.1 mm in the simulated thermal cycle test, is required to be lower than or equal to −125° C. Further, it was found that, in order to satisfy $T\delta_C 0.1 \leq -125$, it is necessary for the following parameters to satisfy $P_{CTOD} \leq 0.02$ and CeqH≤0.225%, the parameters being defined by Patent Document 2 when Ni is not added and being defined by Patent Document 3 when Ni is added. In this case, $P_{CTOD}$ is a parameter used to evaluate a steel component which has an effect on $T\delta_C 0.1$ (FL) representing the CTOD property of the FL, and CeqH is a parameter used to evaluate a steel component which has an effect on the CTOD property through the hardness of the IC zone.

$$P_{CTOD}=[C]+[Cu]/22+[Ni]/67+[V]/3 \qquad \text{Equation 1}$$

$$CeqH=[C]+[Si]/4.16+[Mn]/14.9+[Cu]/12.9+[Ni]/105+[V]/1.82 \qquad \text{Equation 2}$$

In the equations, each element represents the content (mass %) of the element in steel.

However, in this case, since the limited values of $P_{CTOD}$ and CeqH are low, it is necessary that the amount of an alloy element which can be added is significantly limited. Therefore, with a steel plate having a thickness of 6 mm to 100 mm which is commonly used as a structural material, a high strength cannot be obtained. The high strength described in the present invention represents a yield strength (YS) being higher than or equal to 355 N/mm² and a tensile strength (TS) being higher than or equal to 480 N/mm². It is preferable that the thickness is 12 mm to 80 mm, the yield strength is 400 N/mm² to 550 N/mm², and the tensile strength is lower than or equal to 610 N/mm².

For use in an actual structure, it is more preferable that the thickness is 30 mm to 60 mm, the yield strength is 420 N/mm² to 500 N/mm², and the tensile strength is lower than or equal to 570 N/mm². Although the steel includes a steel plate and a steel pipe, the same shall be applied to the steel plate.

Meanwhile, for example, Patent Document 4 discloses a technique of improving a CTOD property at a low temperature by adding B. The technique of improving a CTOD property by controlling the addition amount of B to be 0.0005% to 0.0020% is disclosed. However, a target property of Patent Document 4 is a CTOD property at −30° C. and −50° C. Regarding steel produced based on this technique, when the present inventors investigated a CTOD property in an environment of −80° C. under welding conditions of a submerged arc welding (SAW) method intended in the present invention, the required property was not satisfied.

In addition, for example, Patent Document 5 discloses a technique of improving HAZ toughness by adding 0.0003% to 0.003% of B and controlling the amount of solid-solubilized B to be 0%. However, this technique presupposes large heat input welding, and a target property thereof is HAZ toughness at −20° C. Regarding steel produced based on this technique, when the present inventors investigated a CTOD property in an environment of −80° C. under welding conditions of a submerged arc welding (SAW) method mainly conceived in the present invention, the required property was not satisfied.

PRIOR ART DOCUMENT

Patent Document

[Patent Document 1] Japanese Unexamined Patent Application, First Publication No. 2007-002271

[Patent Document 2] Japanese Unexamined Patent Application, First Publication No. 2010-248590

[Patent Document 3] PCT International Publication No. WO2010/134323A1

[Patent Document 4] Japanese Unexamined Patent Application, First Publication No. H09-1303

[Patent Document 5] PCT International Publication No. WO2009/072559A1

DISCLOSURE OF THE INVENTION

Problems to be Solved by the Invention

Among the HAZ, the FL is subjected to thermal history at the highest temperature during welding, and the IC zone is subjected to thermal history at a high temperature close to a melting temperature during multi-layer welding and then subjected to thermal history at a temperature slightly higher than an Ac1 temperature ($\alpha \rightarrow \gamma$ transformation temperature during heating). In both zones, a CTOD property, in particular, is likely to deteriorate. In the FL subjected to thermal history at a high temperature, the toughness deteriorates by the coarsening of a microstructure. Therefore, it is considered that to fine and make uniform a microstructure is effective. In addition, in both the FL and the IC zone, it is important to reduce large non-metallic inclusions which cause fracture. In order to reduce the non-metallic inclusions, it is considered that reduction in O content (oxygen in steel) is effective. However, on the other hand, when O is reduced, intragranular ferrite (IGF) is decreased, and thus there is a concern that a CTOD property may deteriorate.

Regarding the above-described problems, as described above, there has not been provided a high-strength steel for welding in which the CTOD property of the FL and the CTOD property (fracture toughness) of the IC zone at −80° C. satisfy required values. An object of the present invention is to provide a high-strength steel for welding in which the CTOD property of the FL and the CTOD property of the IC zone (fracture toughness) at −80° C. satisfy required values during multi-layer welding of small to medium heat input.

The small to medium heat input described in the present invention refers to, for example, a heat input of about 1.5 kJ/mm to 5.0 kJ/mm at a thickness of 50 mm.

Means for Solving the Problem

The present inventors have investigated measure which satisfies the strength of a base material as a high-strength steel and satisfies the CTOD properties at −80° C. of the FL and the IC zone, which are embrittled zones of the HAZ of the steel subjected to small to medium heat input welding (for example, 1.5 kJ/mm to 5.0 kJ/mm at a thickness of 50 mm).

As a result, it was found that, by reducing O content and suppressing a coarse grain boundary structure, which is formed in the FL by thermal history during welding, to increase an IGF fraction, the CTOD property can be significantly improved. The above-described IGF refers to acicular ferrite which is formed in a petal shape by using Ti oxides in prior austenite grains of the HAZ as nuclei (which is formed to extend to the periphery around the Ti oxides). Since this IGF has an average grain size of 10 μm or less and is fine, the refining effect is obtained by the IGF itself. In addition, by forming a large amount of the IGF, the formation of a coarse structure which is formed from grain boundaries and is harmful to toughness is suppressed, which results in the refinement of effective grain size. As a result, the IGF significantly contributes to the improvement of a CTOD property.

In addition, it was found that B addition is most effective as a method of increasing the IGF fraction. It has been known that, by B addition, the transformation temperature of steel is decreased, and an effect of making a structure fine and uniform is obtained. However, there are no examples in which B addition is sufficiently utilized to improve the CTOD properties at −80° C. for the following reasons: (i) B capable of exhibiting the effects with a small amount of addition is changed in existence state by binding to an element such as N or O present in steel, and thus there are cases where the desired effects may not be exhibited; and (ii) particularly during small to medium heat input welding whose weld heat input is 5.0 kJ/mm or less and a cooling rate after welding is large, there are cases where the CTOD properties may deteriorate along with an increase in the hardness of the HAZ by B addition. The present inventors found that, in order to secure a desired high CTOD property (fracture toughness), it is effective that (i) is controlled using a parameter capable of securing an amount of B, that is, an effective amount of B required to make B present in steel in the solid solution state and exhibiting a desired effect; and (ii) is controlled using a parameter including the amount of B and the amount of C.

Further, the present inventors found that, in order to more effectively utilize the above-described effects of B, it is effective that steel contains fine Ti oxides.

The present invention has been made based on the above-described findings and had adopted the following measures in order to solve the above-described problems and achieve the above-described object.

(1), That is, according to an aspect of the present invention, there is provided a steel for welding including, as steel components, by mass %, C: a content [C] of 0.015% to 0.045%, Si: a content [Si] of 0.05% to 0.20%, Mn: a content [Mn] of 1.6% to 2.5%, Ni: a content [Ni] of 0.1% to 1.0%, Ti: a content [Ti] of 0.005% to 0.015%, B: a content [B] of 0.0003% to 0.0015%, N: a content [N] of 0.002% to 0.006%, O: a content [O] of 0.0015% to 0.0035%, P: a content [P] limited to 0.008% or less, S: a content [S] limited to 0.005% or less, Al: a content [Al] limited to 0.004% or less, Nb: a content [Nb] limited to 0.004% or less, Cu: a content [Cu] limited to 0.5% or less, V: a content [V] limited to 0.02% or less, and a balance consisting of Fe and unavoidable impurities, in which $P_{CTOD}$ in the following equation 1 is less than or equal to 0.065%, CeqH in the following equation 2 is less than or equal to 0.225%, FB in the following equation 3 is greater than or equal to 0.0003%, and Bp in the a following equation 4 is 0.09% to 0.30%, wherein in a thickness center portion of a cross-section in a thickness direction, the number of oxide particles having an equivalent circle diameter of 2 μm or greater is less than or equal to 20 particles/mm² and the number of Ti oxides having an equivalent circle diameter of 0.05 μm to 0.5 μm is $1.0 \times 10^3$ particles/mm² to $1.0 \times 10^5$ particles/mm², where:

$$P_{CTOD}=[C]+[Cu]/22+[Ni]/67+[V]/3 \qquad \text{Equation 1}$$

$$CeqH=[C]+[Si]/4.16+[Mn]/14.9+[Cu]/12.9+[Ni]/105+[V]/1.82 \qquad \text{Equation 2}$$

$$FB=[B]-0.77\times([N]-0.29\times([Ti]-2\times([O]-0.89\times[Al]))) \qquad \text{Equation 3; and}$$

$$Bp=(884\times[C]\times(1-0.3\times[C]^2)+294)\times FB \qquad \text{Equation 4;}$$

wherein, when O' is defined as O'=[O]−0.89×[Al], if O'≥0, then O'=0;

when Ti' is defined as Ti'=[Ti]−2O', if Ti'≤0, then Ti'=0, when N' is defined as N'=[N]−0.29×Ti', if N'≤0, then N'=0, and when FB≤0, FB=0.

(2) In the steel for welding according to (1), the Cu content [Cu] may be less than or equal to 0.03%.

(3) In the steel for welding according to (1) or (2), the B content [B] may be greater than or equal to 0.0006%.

As described above, in the steel according to the present invention, the CTOD properties of the FL and the IC zone where toughness most significantly deteriorates during welding such as multi-layer welding of small to medium heat input are extremely high, and thus fracture toughness is superior. As a result, a high-strength steel for welding which is used in a offshore structure, an earthquake-resistant building, or the like and has a high CTOD property in a harsh environment can be obtained.

EMBODIMENTS OF THE INVENTION

In an embodiment of the present invention, as described above, in order to refine a microstructure of the FL, B is added. B is segregated on prior austenite grain boundaries and has an effect of decreasing grain boundary energy to significantly delay ferritic transformation of steel. Therefore, a coarse structure such as ferrite, which is formed from grain boundaries of a HAZ structure including coarse austenite grains, is suppressed. Further, by using B in combination with a technique of using oxide-based non-metallic inclusions represented by Ti oxides as transformation nuclei of intragranular ferrite (IGF), a microstructure of the FL is significantly refined. This process is performed in order to increase IGF due to suppressing the transformation of grain boundaries promoting ferritic transformation from the oxide-based non-metallic inclusions present in grain boundaries as the transformation nuclei by solute B. It is necessary that coarse inclusions are decreased because coarse inclusions become fracture origins, and fine inclusions are preferable as the transformation nuclei.

In order to obtain the above-described effects, it is necessary that B in the solute (effective B; FB) is secured in steel containing a predetermined amount of oxide-based non-metallic inclusions as nuclei of intragranular transformation. However, on the other hand, the effect of delaying the ferritic transformation of the grain boundaries obtained by B addition implies improvement of hardenability. Therefore, the hardness of the FL is increased by an increase of hard structure caused by an increase of hardenability, and there is a concern that fracture toughness deteriorates. Therefore, as described below, it is effective to avoid an increase in the hardness of the FL by B addition while securing a required amount of solid-solubilized B.

It was found that, in order to satisfy the CTOD property of a practical welded joint at −80° C. while securing B present in steel in the solid solution state (effective B) to efficiently utilize the B addition effects of refining and uniformizing a microstructure of the FL, a parameter FB which is defined in an equation 3 and represents the amount of effective B and a B parameter Bp which is defined in an equation 4 as a parameter for avoiding an increase in HAZ hardness caused by B.

$$FB=[B]-0.77\times([N]-0.29\times([Ti]-2\times([O]-0.89\times[Al]))) \quad \text{Equation 3}$$

wherein
if O'=[O]−0.89×[Al]≤0, then O'=0;
if Ti'=[Ti]−2O'≤0, then Ti'=0,
if N'=[N]−0.29×Ti'≤0, then N'=0, and
if FB=[B]−0.77×N'≤0, then FB=0.

$$Bp=(884\times[C]\times(1-0.3\times[C]^2)+294)\times FB \quad \text{Equation 4}$$

In the above-described equations, each element represents the amount (mass %) of the element in steel.

Figure 1:
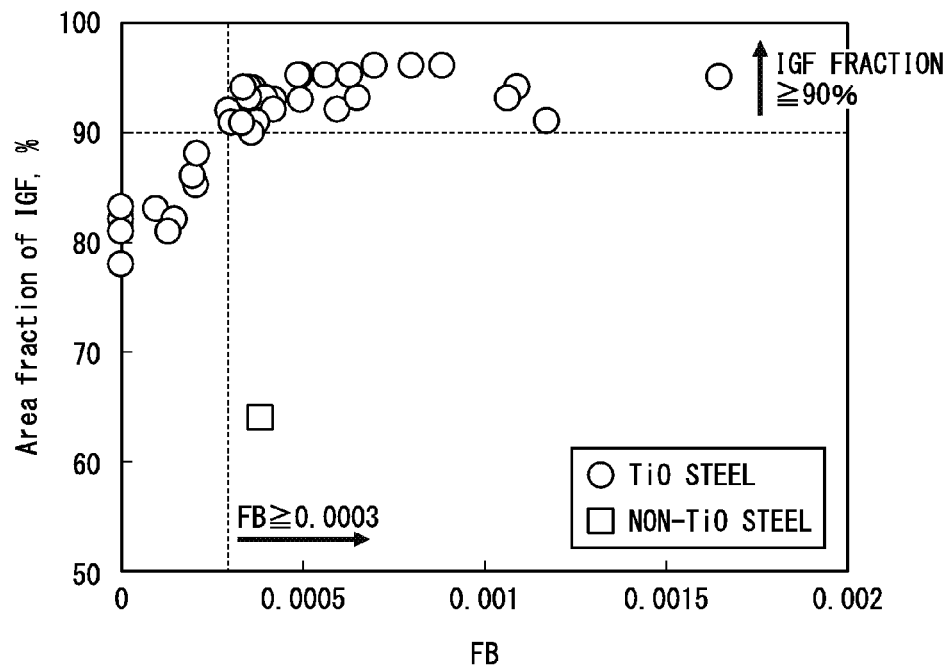
FIG. 1 is a diagram illustrating a relationship between FB and the IGF fraction of the FL of a welded joint.
Figure 2:
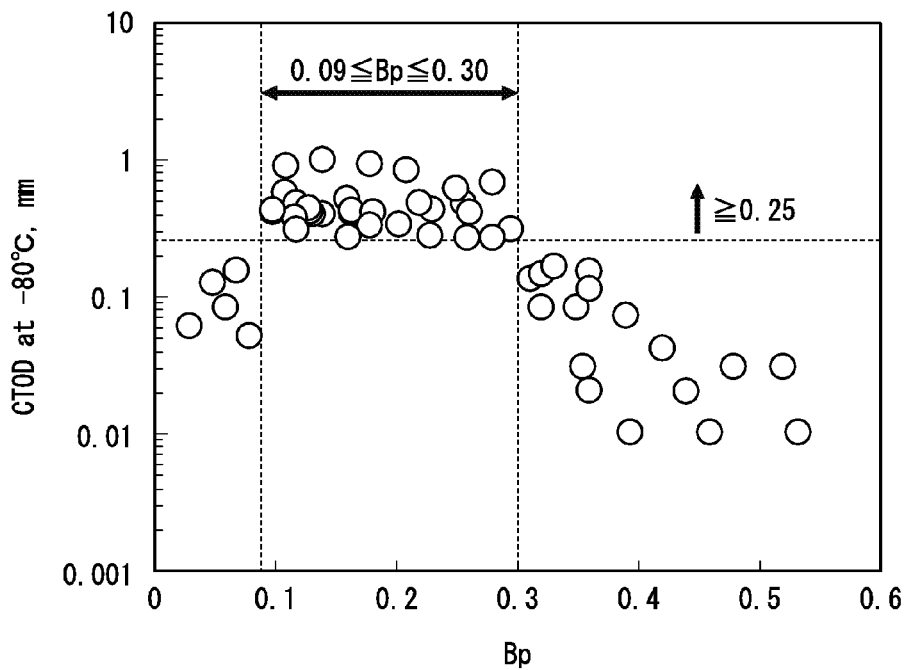
FIG. 2 is a diagram illustrating a relationship between Bp and the minimum value of the CTOD property of a welded joint of the FL at −80° C.

The equation 3 is an equation for calculating the amount of solid-solubilized B (amount of effective B; FB) in steel which is obtained from a stoichiometric ratio in consideration of the strength of a binding power between elements. When FB calculated according to this equation is greater than or equal to 0.0003%, that is, when the amount of effective B is greater than or equal to 0.0003%, B suppresses a coarse grain boundary structure as expected. As a result, in an environment in which IGF can be formed from Ti oxides in the steel, as illustrated in FIG. 1, the IGF fraction in the FL is greater than or equal to 90%. Bp is an empirical equation obtained from analysis in a number of laboratory ingot steels and is parameterized by (Maximum Hardness Estimated from Amount of C)×(Contribution of FB). The higher the amount of FB, the higher HAZ hardness. In particular, FB largely affects a CTOD property at an extremely low temperature as in the embodiment. The present inventors found that, as illustrated in FIG. 2, when Bp is greater than 0.30%, the hardness of the FL is significantly increased, and the CTOD property at −80° C. does not satisfy a desired value which is greater than or equal to 0.25 mm. In addition, in the steel for welding according to the embodiment, when the amount of FB is greater than 0.0003%, the amount of Bp is necessarily greater than or equal to 0.09%. Therefore, a region where Bp is less than 0.09 is a region where the effects of solid-solubilized B which are desirable in the steel for welding according to the embodiment are not obtained. Accordingly, Bp is controlled to be greater than or equal to 0.09. Steel illustrated in FIG. 2 satisfies the range of steel for welding according to the embodiment except for Bp.

When FB is greater than 0.0010%, there is a concern that Bp may be greater than 0.30%. Therefore, it is preferable that the upper limit of FB is 0.0010%.

Further, in order to satisfy the CTOD property of a practical welded joint at −80° C., the following is important: the number of oxides having an equivalent circle diameter of 2 μm or greater being less than or equal to 20 particles/mm$^2$; and the number of Ti oxides having an equivalent circle diameter of 0.05 μm to 0.5 μm, which are present in steel as transformation nuclei being $1.0\times10^3$ particles/mm$^2$ to $1.0\times10^5$ particles/mm$^2$. When the number of oxides having an equivalent circle diameter of 2 μm or greater is more than 20 particles/mm$^2$, the oxides cause fracture, and the CTOD property deteriorates. In addition, when the number of Ti oxides having an equivalent circle diameter of 0.05 μm to 0.5 μm is less than $1.0\times10^3$ particles/mm$^2$, the number of Ti oxides as nuclei used to form IGF is insufficient. When the number of Ti oxides having an equivalent circle diameter of 0.05 μm to 0.5 μm is greater than $1.0\times10^5$ particles/mm$^2$, the Ti oxides cause fracture. In both cases, the CTOD property deteriorates.

As described above, by satisfying both Bp and FB, the further refinement of a microstructure can be achieved while suppressing a significant increase in the hardness of the FL. In addition, it was found that the control of oxide is important. As a result, it was found that when a steel containing the components and the oxide in the specified ranges according to the embodiment is used, Bp and FB are satisfied, $P_{CTOD} \leq 0.065\%$ which is necessary for securing the CTOD properties at $-60°$ C. is satisfied, the number of oxides having an equivalent circle diameter of 2 μm or greater is less than or equal to 20 particles/mm$^2$, and the number of Ti oxides having an equivalent circle diameter of 0.05 μm to 0.5 μm, which are present in steel as transformation nuclei, is $1.0 \times 10^3$ particles/mm$^2$ to $1.0 \times 10^5$ particles/mm$^2$, thereby satisfying the CTOD property of the FL at $-80°$ C. $P_{CTOD}$ is greater than or equal to 0.016% in a composition range of each element described below.

On the other hand, under the harsh condition where a test temperature is $-80°$ C. as described above, even if the CTOD property of the FL satisfies a desired value, the CTOD property of the IC zone may not satisfy a desired value. Therefore, the inventors investigated for the IC zone. As a result, it was found that by controlling the number of oxides having an equivalent circle diameter of 2 μm or greater to be less than or equal to 20 particles/mm$^2$ and satisfying CeqH≤0.225%, the CTOD property at $-80°$ C. is satisfied. In this case, CeqH is greater than or equal to 0.135% in the composition range of each element described below.

Hereinafter, the reason for limiting the steel for welding according to the embodiment will be described. First, the reason for limiting the composition of the steel for welding according to the embodiment will be described. In the following composition, "%" represents "mass %".

C: 0.015% to 0.045%

C is an element used to obtain strength, the C content [C] is greater than or equal to 0.015%. In order to obtain high strength at a low cost, the C content [C] is preferably greater than or equal to 0.018%, or greater than or equal to 0.020% and more preferably greater than or equal to 0.025%, or greater than or equal to 0.030%. On the other hand, when the C content [C] is greater than 0.045%, HAZ properties deteriorate, and the CTOD property at $-80°$ C. cannot be satisfied. Therefore, the upper limit of the C content [C] is set to 0.045%. In order to obtain a higher CTOD property, the C content [C] is preferably less than 0.042%, or less than 0.040%.

Si: 0.05% to 0.20%

From the viewpoint of obtaining the CTOD property, the less Si content, the better. However, from the viewpoint of deoxidation, the Si content [Si] is set to be greater than or equal to 0.05%. The Si content [Si] is preferably greater than or equal to 0.08%, or greater than or equal to 0.10%. However, when the Si content [Si] is greater than 0.20%, the CTOD property of the FL deteriorates. Therefore, the upper limit of the Si content [Si] is set to 0.20%. In order to obtain a higher CTOD property, the Si content [Si] is preferably less than or equal to 0.18%, or less than or equal to 0.15%.

Mn: 1.6% to 2.5%

Mn is an inexpensive element having a high effect of adjusting a microstructure, has an effect of suppressing transformation form grain boundaries which is harmful to the CTOD property, and barely impairs the CTOD property. Therefore, it is preferable that the addition amount of Mn be increased. When the Mn content [Mn] is less than 1.6%, the effect of adjusting a microstructure is low. Therefore, the lower limit of the Mn content [Mn] is set to 1.6%. The lower limit is preferably 1.7% and more preferably 1.8%. On the other hand, when the Mn content [Mn] is greater than 2.5%, the hardenability of the FL may be excessively high or the hardness of the ICHAZ may be increased. As a result, the CTOD property deteriorates. Therefore, the upper limit of the Mn content [Mn] is set to 2.5%. The upper limit is preferably 2.3%, more preferably 2.2%, and still more preferably 2.0%.

P: 0.008% or less

P is contained as an unavoidable impurity and impairs the toughness of steel when being segregated on grain boundaries. The lower the P content [P], the better. However, since there is a limit in industrial production, the upper limit of the P content [P] is set to 0.008%. In order to obtain a higher CTOD property, the P content [P] is preferably less than or equal to 0.005%. P is an unavoidable impurity, and the lower limit of the P content [P] is 0%.

S: 0.005% or less

P is contained as an unavoidable impurity. From the viewpoint of base metal toughness and the CTOD property, the lower the S content [S], the better. However, since there is a limit in industrial production, the upper limit of the S content [S] is set to 0.005%. In order to obtain a higher CTOD property, the S content [S] is preferably less than or equal to 0.003% or less than or equal to 0.002%. S is an unavoidable impurity, and the lower limit of the S content [S] is 0%.

Ni: 0.1% to 1.0%

Ni is an effective element because Ni causes small deterioration of the CTOD property, is effective for improving the strength of a base metal, and causes a small increase in the hardness of the ICHAZ. However, Ni is an expensive element, which results in an increase in cost. Therefore, the Ni content [Ni] is set to be less than or equal to 1.0%. The Ni content [Ni] is preferably less than or equal to 0.8%, more preferably less than or equal to 0.7%, or less than or equal to 0.6%, and still more preferably less than or equal to 0.5%, or less than or equal to 0.45%. On the other hand, in order to obtain an effect of a case where Ni is added, the lower limit of the Ni content [Ni] is set to 0.1%. In order to more efficiently utilize the effects of Ni, it is preferable that 0.2% or greater of Ni be added, and it is more preferable that 0.25% or greater of Ni be added. When the improvement in the strength of a base metal is prioritized rather than an increase in alloy cost, 0.4% or greater, 0.5% or greater, or 0.6% or greater of Ni may be added.

Al: 0.004% or less

From the viewpoints of forming Ti oxide to obtain IGF, the lower the Al content [Al], the better. Therefore, the upper limit of the Al content [Al] is set to 0.004%. In order to obtain a larger amount of IGF and a higher CTOD property, the Al content [Al] is preferably less than or equal to 0.003%, or less than or equal to 0.002%. The lower limit of the Al content [Al] is 0%.

Ti: 0.005% to 0.015%

Ti forms Ti oxides and refines a microstructure. However, when the Ti content is excessive, coarse TiC is formed in the FL, and the CTOD property deteriorates. In addition, a hard structure may be formed in the IC zone by the formation of TiC, or TiC may cause fracture. Therefore, an appropriate range of the Ti content [Ti] is 0.005% to 0.015%. In order to more efficiently utilize the effects of Ti, the Ti content [Ti] is preferably greater than or equal to 0.007% and more preferably greater than or equal to 0.008%. On the other hand, in order to further improve the CTOD property, the Ti content [Ti] is preferably less than or equal to 0.013%.

Nb: 0.004% or less

Nb is effective from the viewpoints of the strength and toughness of a base metal and is harmful to the CTOD property of the FL. Therefore, the Nb content [Nb] is limited to 0.004% or less which is a range where the CTOD property does not significantly deteriorate. However, in order to further improve the CTOD property, the Nb content [Nb] is preferably limited to 0.003% or less, or 0.002% or less and more preferably limited to 0.001% or less. The lower limit of the Nb content [Nb] is 0%.

B: 0.0003% to 0.0015%

B is an element that is segregated on prior austenite grain boundaries of the HAZ and has an effect of suppressing a coarse grain boundary structure, which is harmful to the CTOD property, and has an effect of uniformizing the microstructure of the FL. Therefore, the B content [B] is set to be greater than or equal to 0.0003%. However, in order to efficiently utilize the effects of B, the B content [B] is preferably greater than or equal to 0.0004%, or greater than or equal to 0.0006%. On the other hand, there is a concern that the hardness of the FL may be significantly increased by excessive addition, and the CTOD property may deteriorate. Therefore, the upper limit of the B content [B] is set to 0.0015%. In order to further improve the CTOD property of the FL, the B content [B] is preferably less than or equal to 0.0013%, or less than or equal to 0.0011%.

N: 0.002% to 0.006%

N is necessary to form Ti nitride. However, when the N content [N] is less than 0.002%, the effect of N is low. Therefore, the lower limit of the N content [N] is set to 0.002%. In order to more efficiently utilize the effect of N, the lower limit of the N content [N] is preferably set to 0.0025% and more preferably set to be 0.003%. On the other hand, when the N content [N] is greater than 0.006%, coarse Ti nitrides which cause fracture are formed, and thus the CTOD property deteriorates. Therefore, the upper limit of the N content [N] is set to 0.006%. In order to obtain a higher CTOD property, the N content [N] is preferably less than or equal to 0.005%. The N content [N] is preferably less than or equal to 0.0045%, or less than or equal to 0.004%.

O: 0.0015% to 0.0035%

From the viewpoint of forming Ti oxides as nuclei for forming IGF of the FL, the O content [O] is set to be greater than or equal to 0.0015%. In order to efficiently utilize the effect of O, the O content [O] is preferably greater than or equal to 0.0020%. However, when O is excessive, the size and number of oxides are excessive, and thus the CTOD properties of the FL and the IC zone deteriorate. Therefore, the upper limit of the O content [O] is set to 0.0035%. In order to obtain a higher CTOD property, the O content [O] is preferably less than or equal to 0.0030% and more preferably less than or equal to 0.0028%, or less than or equal to 0.026%.

The above-described elements are essential to the steel for welding according to the embodiment, and it is also effective to add the following elements within a range not impairing the effects of the above-described elements.

Cu: 0.5% or less

Cu is an effective element because Cu has an effect of improving the strength of a base metal and causes a small increase in the hardness of the ICHAZ. However, when the Cu content [Cu] is greater than 0.5%, Cu promotes the formation of martensite-austenite (M-A) constituent and suppresses decomposition thereof, which results in deterioration in the CTOD property of the FL. Accordingly, the limited range of the Cu content [Cu] is set to be less than or equal to 0.5% as a range that does not impair the CTOD property. However, in order to obtain a higher CTOD property, the Cu content [Cu] is preferably less than or equal to 0.3%, or less than or equal to 0.1%. In order to secure a more stable CTOD property, it is preferable that the Cu content [Cu] be limited to 0.05% or less, or 0.03% or less. The lower limit of the Cu content [Cu] is 0%.

V: 0.02% or less

V is an effective element for improving the strength of a base metal. However, when the V content [V] is greater than 0.02%, the CTOD property deteriorates. Therefore, the upper limit of the V content [V] is set to be less than or equal to 0.02% as a range that does not impair the CTOD property. In order to secure a higher CTOD property, the V content [V] is preferably less than 0.01%. The lower limit of the V content [V] is 0%.

In the steel for welding according to the embodiment, the above-described components are contained or limited, and a balance including Fe and unavoidable impurities is contained. However, in addition to the above-described components, the steel for welding according to the embodiment may contain other alloy elements in order to further improve the corrosion resistance and the hot workability of the steel itself or as unavoidable impurities produced from auxiliary raw materials such as scrap. However, in order to sufficiently exhibit the above-described effects (such as the improvement in the toughness of a base metal) of the above-described components (such as Ni), it is preferable that the respective alloy elements (Cr, Mo, Ca, Mg, Sb, Sn, As, and REM) are limited as follows. The amount of each of the alloy elements includes 0%. Even if these elements are intentionally added, the elements may be considered as unavoidable impurities as long as the addition amounts thereof are within ranges described below.

Since Cr impairs the CTOD property, the Cr content [Cr] is preferably less than or equal to 0.1%, more preferably less than or equal to 0.05%, and most preferably less than or equal to 0.02%. The lower limit of the Cr content [Cr] is 0%.

Since Mo impairs the CTOD property, the Mo content [Mo] is preferably less than or equal to 0.05%, more preferably less than or equal to 0.03%, and most preferably less than or equal to 0.01%. The lower limit of the Mo content [Mo] is 0%.

Since Ca has an effect of suppressing the formation of Ti oxides, the Ca content [Ca] is preferably less than 0.0003% and more preferably less than 0.0002% or less than 0.0001%. The lower limit of the Ca content [Ca] is 0%.

Since Mg has an effect of suppressing the formation of Ti oxides, the Mg content [Mg] is preferably less than 0.0003% and more preferably less than 0.0002% or less than 0.0001%. The lower limit of the Mg content [Mg] is 0%.

Since Sb impairs the CTOD property, the Sb content [Sb] is preferably less than or equal to 0.005%, more preferably less than or equal to 0.003%, and most preferably less than or equal to 0.001%. The lower limit of the Sb content [Sb] is 0%.

Since Sn impairs the CTOD property, the Sn content [Sn] is preferably less than or equal to 0.005%, more preferably less than or equal to 0.003%, and most preferably less than or equal to 0.001%. The lower limit of the Sn content [Sn] is 0%.

Since As impairs the CTOD property, the As content [As] is preferably less than or equal to 0.005%, more preferably less than or equal to 0.003%, and most preferably less than or equal to 0.001%. The lower limit of the As content [As] is 0%.

Since REM (a rare earth metal) has an effect of suppressing the formation of Ti oxides, the REM content [REM] is preferably less than or equal to 0.005%, more preferably less than or equal to 0.003%, and most preferably less than 0.002% or less than 0.001%. In addition to the above-described elements, the steel for welding according to the embodiment may contain impurities which are unavoidably mixed thereinto during a production process or the like within a range not impairing the characteristics of the embodiment. However, it is preferable that the steel for welding according to the embodiment not contain the impurities. The lower limit of the impurities is 0%.

Even if steel components are limited as described, the desired effects cannot be obtained without an appropriate production method. Therefore, when the steel for welding according to the embodiment is produced, the following production conditions are preferable.

It is preferable that the steel for welding according to the embodiment is produced with a continuous casting method. The reason is as follows. In this method, the solidification cooling rate of molten steel is fast, and thus the formation of coarse oxides which cause fracture can be avoided. As a result, a larger amount of fine Ti oxides can be formed in scrap. In a method of producing the steel for welding according to the embodiment, it is preferable that an average cooling rate of a center portion of a slab from about a solidifying point to 800° C. is faster than or equal to 5° C./min. The reason is to obtain less than or equal to 20 particles/mm$^2$ of oxides having an equivalent circle diameter of 2 μm or greater in steel and to obtain $1.0 \times 10^3$ particles/mm$^2$ to $1.0 \times 10^5$ particles/mm$^2$ of Ti oxides having an equivalent circle diameter of 0.05 μm to 0.5 μm. When the cooling rate of a slab is slower than 5° C./min, it is difficult to obtain fine oxide, and coarse oxides are increased. On the other hand, even if the average cooling rate is faster than 50° C./min, the number of fine Ti oxides is not increased, but rather the production cost is increased. Therefore, the average cooling rate may be slower than or equal to 50° C./min.

The average cooling rate of a center portion of a slab can be obtained by thermal transfer calculation after measuring a cooling rate of a slab surface. In addition, the average cooling rate can also be obtained by thermal transfer calculation after measuring a casting temperature and the amount of cooling water.

During slab rolling, the reheating temperature (heating temperature) is preferably 950° C. to 1100° C. When the reheating temperature is higher than 1100° C., Ti nitrides are coarsened, the toughness of a base metal deteriorates, and the effect of improving the CTOD property is decreased. In addition, when the reheating temperature is lower than 950° C., the load of rolling is high, which significantly inhibits productivity. Therefore, the lower limit of the reheating temperature is preferably set to 950° C. From the viewpoints of securing base metal toughness and the productivity, the reheating temperature is preferably 950° C. to 1100° C. However, when higher base metal toughness is required, the reheating temperature is more preferably 950° C. to 1050° C.

In the production method, after reheating, it is preferable that a thermo-mechanical treatment is performed. This is because even if steel has a high CTOD property, when toughness of a base metal is poor it is not sufficient as the steel for welding. The thermo-mechanical treatment is a treatment of controlling a rolling temperature to a suitable range according to steel components and then optionally performing water cooling or the like. Through this treatment, austenite grains and a microstructure can be refined. As a result, the strength of steel and the toughness can be improved. As a condition of the thermo-mechanical treatment, it is preferable that a cumulative rolling reduction in a non-recrystallization temperature range (700° C. to 850° C.) is higher than or equal to 30%.

Examples of a method of the thermo-mechanical treatment include (i) controlled rolling (hereinafter, simply referred to as CR), (ii) controlled rolling-accelerated cooling (CR+ACC; hereinafter, simply referred to as ACC), and (iii) controlled rolling-accelerated cooling-tempering (CR+ACC+T; hereinafter simply referred to as ACC+T). Among these methods, (ii) controlled rolling-accelerated cooling is preferable. Examples of the respective methods of the thermo-mechanical treatment will be described. In the case of (i) controlled rolling, a slab is heated at 950° C. to 1100° C., is rolled at a cumulative rolling reduction of 30% or higher in a non-recrystallization temperature range (700° C. to 850° C.), and then is air-cooled to room temperature. In the case of (ii) controlled rolling-accelerated cooling, the same procedure as that of (i) is performed until rolling, followed by accelerated cooling with a water cooling machine from 650° or higher to 500° C. or lower at a cooling rate of 5° C./s or faster. In the case of (iii) controlled rolling-accelerated cooling-tempering, the same procedure as that of (ii) is performed until accelerated cooling, followed by tempering in a heat treatment furnace at 400° C. to 660° C. After the thermo-mechanical treatment, even if this steel is reheated at a temperature lower than or equal to the Ar3 transformation point for purposes such as dehydrogenation treatment, the characteristics of the steel for welding according to the environment are not impaired.

EXAMPLES

Hereinafter, the present invention will be described based on examples.

Steel making was performed in a converter, molten steel was cast into slabs, and these slabs were subjected to a thermo-mechanical treatment in a steel plate production process. As a result, steel plates having various steel components were produced. Next, regarding each of the produced steel plates, a base metal strength test and a CTOD test of a welded joint were performed. Using a submerged arc welding (SAW) method which was commonly used during test welding, the welded joint was manufactured by K-groove under a welding condition of a weld heat input of 4.5 kJ/mm to 5.0 kJ/mm such that fusion lines (FL) were vertically formed.

In the CTOD test, 5 test specimens having a size of t (thickness)×2t were tested according to BS7448 Part 1 (British Standard) at −80° C. under a condition where a notch of 50% fatigue crack was formed at notch position which is the FL (boundary between the WM and the HAZ) or the IC zone (boundary between the HAZ and the BM (base metal)). The desired minimum and average values of CTOD were greater than or equal to 0.25 mm.

A HAZ structure of the FL was etched with a Nital etchant and was observed through an optical microscope and a SEM. The IGF fraction was obtained by observing a structure image in three visual fields at an arbitrary magnification, measuring area ratios thereof by visual inspection, and averaging the area ratios.

The number of oxides of the steel was measured with the following method. A cross-section sample of a center portion in a thickness direction was collected from each of the steels. Using a field emission scanning electron microscope (FE-SEM), coarse oxides having an equivalent circle diameter of 2 μm or greater were observed to measure the size and the number thereof. Regarding Ti oxides having an equivalent circle diameter of 0.05 μm to 0.5 μm, similarly, a sample was collected from the center portion in the thickness direction. An extraction replica film was created from the sample which was electrolytically polished by Selective Potentiostatic Etching by Electrolytic Dissolution (SPEED). The extraction replica film was observed with a field emission transmission electron microscope (FE-TEM) at 10000 magnifications to 1000000 magnifications. Using energy dispersive X-ray spectrometry (EDX), oxides in which a weight ratio of Ti obtained from characteristic X-rays was higher than or equal to 10% were determined as Ti-containing oxides. Based on these results, the size and the number of the Ti-containing oxides were measured. By observing a thickness center portion of a cross-section of each sample in the thickness direction in 20 or more visual fields, the average value of the numbers of oxide particles per unit area was calculated. The reason why the measurement position was set to the thickness center portion is that the CTOD property is particularly affected by the toughness of the thickness center portion which is affected by plastic constraint. The cross-section in the thickness direction is a cross-section obtained by cutting the steel along the thickness direction (direction from the front surface to the back surface of the steel plate).

Tables 1 and 2 show the chemical compositions of the steels, and Tables 3 and 4 show the production conditions, the base metals, and the CTOD properties of the welded joint. In Tables 3 and 4, the symbols of the thermo-mechanical treatment represent the following heat treatment methods.

CR: Controlled rolling (rolling was performed in a temperature range optimum for strength and toughness)

ACC: Accelerated cooling (after controlled rolling, water cooling was performed to a temperature range from 400° C. to 600° C., followed by controlled rolling)

ACC+T: Quenching immediately after rolling, +tempering (immediately after rolling, water cooling was performed to room temperature, followed by tempering)

Among the chemical compositions of Tables 1 and 2, Cr, Mo, Ca, Sb, Sn, As, and REM were not intentionally added.

Among the CTOD test results of the welded joint in Tables 3 and 4, $\delta_{CAve}$ represents the average value of the five test results, and $\delta_{Cmin}$ represents the minimum value of the five test results.

In the steels produced according to the present invention (Steels 1 to 33 according to the present invention), the yield strength (YS) was higher than or equal to 420 N/mm$^2$, the tensile strength (TS) was higher than or equal to 480 N/mm$^2$, and the CTOD value at −80° C. was greater than or equal to 0.30 mm at $\delta_{Cmin}$ of the FL notch and was greater than or equal to 0.63 mm at $\delta_{Cmin}$ of the IC notch, that is, the fracture toughness was superior. In addition, at this time, the IGF fraction in the HAZ structure of the FL was higher than or equal to 90% in all the steels.

In Steel 34, the chemical composition satisfied the chemical composition according to the present invention, but the cooling rate of the slab did not satisfy the desirable production conditions. As a result, the number of oxide particle having an equivalent circle diameter of 2 μm or greater, or the number of Ti oxides having an equivalent circle diameter of 0.05 μm to 0.5 μm was out of the range of the present invention, and the CTOD properties of the FL and the IC zone did not satisfy the desired values.

On the other hand, as clearly seen from Table 2, Steels 35 to 55 are Comparative Examples in which the chemical composition was out of the range of the present invention. In these steels, the following conditions were different from those of the present invention: the C content (Steel 38), the Si content (Steel 43), the Mn content (Steel 37, Steel 47), the Ni content (Steel 35), the Al content (Steel 52), the Ti content (Steel 36, Steel 44, Steel 50), the B content (Steel 41, Steel 45, Steel 49), Nb content (Steel 53), the O content (Steel 39, Steel 55), the N content (Steel 51), the Cu content (Steel 42), the V content (Steel 46), $P_{CTOD}$ (Steel 48), CeqH (Steel 37, Steel 40, Steel 42, Steel 48), FB (Steel 39, Steel 45, Steel 46, Steel 47, Steel 50, Steel 51), and Bp (Steel 38, Steel 39, Steel 41, Steel 45, Steel 46, Steel 47, Steel 49, Steel 50, Steel 51, Steel 54). In addition, in Steel 52, the Al content was different from that of the present invention. As a result, the number of Ti oxides having an equivalent circle diameter of 0.05 μm to 0.5 μm did not satisfy that of the present invention. The strength values of most of the comparative steels were equivalent to those of the steels according to the present invention although the strength values of a part of the comparative steels were lower than the desired strength. However, the CTOD values were poor. Therefore, the comparative steels were not appropriate as a steel used in a harsh environment.

TABLE 1

| | | CHEMICAL COMPONENT (mass %) | | | | | | | | | | | | |
|---|---|---|---|---|---|---|---|---|---|---|---|---|---|---|
| | | C | Si | Mn | P | S | Ni | Al | Ti | Nb | N | B | O | Cu | V |
| STEEL ACCORDING TO PRESENT INVENTION | 1 | 0.031 | 0.10 | 2.50 | 0.004 | 0.003 | 0.26 | 0.002 | 0.011 | 0.002 | 0.0026 | 0.0005 | 0.0022 | 0.00 | 0.000 |
| | 2 | 0.042 | 0.13 | 1.72 | 0.004 | 0.002 | 0.44 | 0.002 | 0.005 | 0.001 | 0.0022 | 0.0011 | 0.0020 | 0.00 | 0.000 |
| | 3 | 0.040 | 0.20 | 1.81 | 0.003 | 0.003 | 0.46 | 0.002 | 0.011 | 0.002 | 0.0025 | 0.0004 | 0.0021 | 0.00 | 0.000 |
| | 4 | 0.039 | 0.14 | 1.65 | 0.004 | 0.003 | 0.99 | 0.002 | 0.010 | 0.002 | 0.0032 | 0.0006 | 0.0018 | 0.00 | 0.000 |
| | 5 | 0.043 | 0.12 | 1.95 | 0.005 | 0.002 | 0.43 | 0.003 | 0.015 | 0.001 | 0.0058 | 0.0015 | 0.0027 | 0.00 | 0.000 |
| | 6 | 0.045 | 0.11 | 1.80 | 0.004 | 0.002 | 0.30 | 0.002 | 0.012 | 0.001 | 0.0035 | 0.0010 | 0.0020 | 0.32 | 0.000 |
| | 7 | 0.032 | 0.10 | 1.88 | 0.003 | 0.003 | 0.40 | 0.002 | 0.012 | 0.002 | 0.0035 | 0.0007 | 0.0019 | 0.50 | 0.000 |
| | 8 | 0.041 | 0.11 | 1.63 | 0.004 | 0.003 | 0.45 | 0.002 | 0.014 | 0.001 | 0.0033 | 0.0003 | 0.0024 | 0.00 | 0.000 |
| | 9 | 0.015 | 0.12 | 1.92 | 0.004 | 0.002 | 0.51 | 0.002 | 0.013 | 0.002 | 0.0039 | 0.0006 | 0.0021 | 0.00 | 0.000 |
| | 10 | 0.038 | 0.13 | 1.68 | 0.005 | 0.003 | 0.41 | 0.002 | 0.015 | 0.000 | 0.0035 | 0.0005 | 0.0022 | 0.00 | 0.000 |
| | 11 | 0.032 | 0.12 | 1.96 | 0.004 | 0.003 | 0.31 | 0.002 | 0.011 | 0.001 | 0.0037 | 0.0010 | 0.0020 | 0.27 | 0.009 |
| | 12 | 0.039 | 0.11 | 1.94 | 0.004 | 0.003 | 0.43 | 0.003 | 0.014 | 0.002 | 0.0031 | 0.0007 | 0.0035 | 0.00 | 0.000 |
| | 13 | 0.044 | 0.14 | 2.01 | 0.005 | 0.002 | 0.49 | 0.002 | 0.012 | 0.003 | 0.0032 | 0.0004 | 0.0022 | 0.00 | 0.000 |
| | 14 | 0.040 | 0.13 | 1.87 | 0.003 | 0.003 | 0.44 | 0.002 | 0.012 | 0.002 | 0.0020 | 0.0005 | 0.0023 | 0.00 | 0.000 |
| | 15 | 0.031 | 0.12 | 1.96 | 0.004 | 0.003 | 0.45 | 0.002 | 0.011 | 0.002 | 0.0028 | 0.0008 | 0.0023 | 0.00 | 0.000 |
| | 16 | 0.030 | 0.14 | 1.91 | 0.004 | 0.002 | 0.40 | 0.004 | 0.009 | 0.001 | 0.0033 | 0.0009 | 0.0035 | 0.00 | 0.000 |
| | 17 | 0.039 | 0.13 | 1.77 | 0.004 | 0.003 | 0.46 | 0.002 | 0.012 | 0.002 | 0.0049 | 0.0015 | 0.0018 | 0.00 | 0.000 |
| | 18 | 0.032 | 0.10 | 1.92 | 0.003 | 0.003 | 0.43 | 0.002 | 0.012 | 0.001 | 0.0033 | 0.0004 | 0.0019 | 0.00 | 0.018 |
| | 19 | 0.038 | 0.05 | 1.69 | 0.004 | 0.002 | 0.52 | 0.002 | 0.011 | 0.001 | 0.0030 | 0.0008 | 0.0021 | 0.00 | 0.000 |
| | 20 | 0.030 | 0.13 | 2.02 | 0.005 | 0.003 | 0.42 | 0.002 | 0.011 | 0.002 | 0.0030 | 0.0007 | 0.0024 | 0.30 | 0.000 |
| | 21 | 0.032 | 0.11 | 1.61 | 0.004 | 0.003 | 0.80 | 0.002 | 0.009 | 0.002 | 0.0035 | 0.0010 | 0.0018 | 0.00 | 0.000 |
| | 22 | 0.044 | 0.14 | 1.86 | 0.003 | 0.003 | 0.40 | 0.002 | 0.011 | 0.001 | 0.0037 | 0.0008 | 0.0019 | 0.00 | 0.020 |
| | 23 | 0.026 | 0.17 | 2.30 | 0.004 | 0.003 | 0.12 | 0.002 | 0.011 | 0.001 | 0.0034 | 0.0007 | 0.0020 | 0.04 | 0.000 |
| | 24 | 0.037 | 0.07 | 1.93 | 0.004 | 0.002 | 0.32 | 0.002 | 0.011 | 0.001 | 0.0032 | 0.0006 | 0.0022 | 0.00 | 0.000 |
| | 25 | 0.038 | 0.18 | 2.10 | 0.004 | 0.002 | 0.19 | 0.002 | 0.010 | 0.001 | 0.0030 | 0.0008 | 0.0024 | 0.00 | 0.000 |
| | 26 | 0.024 | 0.15 | 1.92 | 0.005 | 0.003 | 0.52 | 0.002 | 0.011 | 0.001 | 0.0030 | 0.0007 | 0.0022 | 0.00 | 0.000 |
| | 27 | 0.034 | 0.12 | 1.85 | 0.005 | 0.003 | 0.45 | 0.002 | 0.012 | 0.001 | 0.0031 | 0.0008 | 0.0029 | 0.00 | 0.000 |
| | 28 | 0.036 | 0.13 | 1.86 | 0.004 | 0.003 | 0.43 | 0.003 | 0.007 | 0.002 | 0.0025 | 0.0009 | 0.0018 | 0.00 | 0.000 |
| | 29 | 0.032 | 0.12 | 1.78 | 0.005 | 0.003 | 0.46 | 0.002 | 0.008 | 0.001 | 0.0030 | 0.0010 | 0.0020 | 0.00 | 0.000 |
| | 30 | 0.035 | 0.14 | 1.83 | 0.004 | 0.003 | 0.44 | 0.003 | 0.010 | 0.002 | 0.0036 | 0.0013 | 0.0023 | 0.00 | 0.000 |
| | 31 | 0.041 | 0.13 | 1.90 | 0.005 | 0.002 | 0.70 | 0.003 | 0.011 | 0.001 | 0.0033 | 0.0008 | 0.0021 | 0.00 | 0.000 |
| | 32 | 0.030 | 0.13 | 1.86 | 0.005 | 0.003 | 0.47 | 0.002 | 0.010 | 0.001 | 0.0031 | 0.0007 | 0.0022 | 0.03 | 0.000 |

TABLE 1-continued

| | | C | Si | Mn | P | S | Ni | Al | Ti | Nb | N | B | O | Cu | V |
|---|---|---|---|---|---|---|---|---|---|---|---|---|---|---|---|
| | 33 | 0.018 | 0.16 | 1.96 | 0.005 | 0.003 | 0.20 | 0.002 | 0.010 | 0.001 | 0.0032 | 0.0010 | 0.0022 | 0.00 | 0.000 |
| | 34 | 0.032 | 0.13 | 1.86 | 0.004 | 0.003 | 0.41 | 0.001 | 0.011 | 0.001 | 0.0027 | 0.0008 | 0.0021 | 0.00 | 0.000 |

| | | | CHEMICAL COMPONENT (mass %) | | | | | | | | | |
|---|---|---|---|---|---|---|---|---|---|---|---|---|
| | | | Cr | Mo | Ca | Mg | Sb | Sn | As | REM | $P_{CTOD}$ | $C_{eqH}$ | FB | Bp |
| STEEL ACCORDING TO PRESENT INVENTION | 1 | 0.01 | 0.00 | 0.0003 | 0.0001 | 0.003 | 0.002 | 0.003 | 0.0002 | 0.035 | 0.225 | 0.00050 | 0.16 |
| | 2 | 0.01 | 0.00 | 0.0002 | 0.0003 | 0.002 | 0.001 | 0.002 | 0.0001 | 0.049 | 0.193 | 0.00042 | 0.14 |
| | 3 | 0.01 | 0.00 | 0.0003 | 0.0001 | 0.003 | 0.002 | 0.001 | 0.0002 | 0.047 | 0.214 | 0.00040 | 0.13 |
| | 4 | 0.01 | 0.00 | 0.0002 | 0.0003 | 0.001 | 0.001 | 0.003 | 0.0003 | 0.054 | 0.193 | 0.00036 | 0.12 |
| | 5 | 0.01 | 0.00 | 0.0003 | 0.0002 | 0.002 | 0.002 | 0.001 | 0.0003 | 0.049 | 0.207 | 0.00037 | 0.12 |
| | 6 | 0.01 | 0.00 | 0.0003 | 0.0000 | 0.003 | 0.003 | 0.003 | 0.0002 | 0.064 | 0.220 | 0.00089 | 0.30 |
| | 7 | 0.01 | 0.00 | 0.0003 | 0.0003 | 0.003 | 0.003 | 0.001 | 0.0001 | 0.061 | 0.225 | 0.00063 | 0.20 |
| | 8 | 0.01 | 0.00 | 0.0001 | 0.0002 | 0.002 | 0.002 | 0.002 | 0.0000 | 0.048 | 0.181 | 0.00030 | 0.10 |
| | 9 | 0.01 | 0.00 | 0.0003 | 0.0000 | 0.003 | 0.003 | 0.001 | 0.0003 | 0.023 | 0.178 | 0.00036 | 0.11 |
| | 10 | 0.01 | 0.00 | 0.0002 | 0.0002 | 0.001 | 0.001 | 0.002 | 0.0003 | 0.044 | 0.186 | 0.00050 | 0.16 |
| | 11 | 0.01 | 0.00 | 0.0000 | 0.0001 | 0.003 | 0.003 | 0.003 | 0.0002 | 0.052 | 0.221 | 0.00051 | 0.16 |
| | 12 | 0.01 | 0.00 | 0.0003 | 0.0003 | 0.003 | 0.002 | 0.001 | 0.0003 | 0.045 | 0.200 | 0.00070 | 0.23 |
| | 13 | 0.01 | 0.00 | 0.0003 | 0.0003 | 0.002 | 0.001 | 0.003 | 0.0001 | 0.051 | 0.217 | 0.00040 | 0.13 |
| | 14 | 0.01 | 0.00 | 0.0002 | 0.0003 | 0.001 | 0.002 | 0.003 | 0.0003 | 0.047 | 0.201 | 0.00050 | 0.16 |
| | 15 | 0.01 | 0.00 | 0.0003 | 0.0002 | 0.002 | 0.000 | 0.002 | 0.0001 | 0.038 | 0.196 | 0.00080 | 0.26 |
| | 16 | 0.01 | 0.00 | 0.0003 | 0.0003 | 0.001 | 0.003 | 0.001 | 0.0000 | 0.036 | 0.196 | 0.00037 | 0.12 |
| | 17 | 0.01 | 0.00 | 0.0003 | 0.0003 | 0.003 | 0.003 | 0.003 | 0.0003 | 0.046 | 0.193 | 0.00040 | 0.13 |
| | 18 | 0.01 | 0.00 | 0.0001 | 0.0003 | 0.002 | 0.002 | 0.003 | 0.0003 | 0.044 | 0.199 | 0.00040 | 0.13 |
| | 19 | 0.00 | 0.00 | 0.0003 | 0.0001 | 0.001 | 0.001 | 0.002 | 0.0003 | 0.046 | 0.168 | 0.00080 | 0.26 |
| | 20 | 0.01 | 0.00 | 0.0002 | 0.0003 | 0.002 | 0.002 | 0.003 | 0.0002 | 0.050 | 0.224 | 0.00057 | 0.18 |
| | 21 | 0.01 | 0.00 | 0.0000 | 0.0001 | 0.001 | 0.003 | 0.001 | 0.0002 | 0.044 | 0.174 | 0.00031 | 0.10 |
| | 22 | 0.00 | 0.00 | 0.0003 | 0.0002 | 0.001 | 0.000 | 0.000 | 0.0001 | 0.057 | 0.217 | 0.00035 | 0.12 |
| | 23 | 0.01 | 0.00 | 0.0001 | 0.0003 | 0.002 | 0.002 | 0.003 | 0.0002 | 0.030 | 0.225 | 0.00044 | 0.14 |
| | 24 | 0.02 | 0.00 | 0.0002 | 0.0003 | 0.000 | 0.001 | 0.002 | 0.0003 | 0.042 | 0.186 | 0.00040 | 0.13 |
| | 25 | 0.01 | 0.00 | 0.0003 | 0.0003 | 0.003 | 0.002 | 0.001 | 0.0003 | 0.041 | 0.224 | 0.00045 | 0.15 |
| | 26 | 0.02 | 0.00 | 0.0002 | 0.0002 | 0.003 | 0.001 | 0.001 | 0.0002 | 0.032 | 0.194 | 0.00066 | 0.21 |
| | 27 | 0.01 | 0.00 | 0.0001 | 0.0002 | 0.002 | 0.001 | 0.002 | 0.0002 | 0.041 | 0.191 | 0.00059 | 0.19 |
| | 28 | 0.00 | 0.00 | 0.0003 | 0.0000 | 0.001 | 0.002 | 0.002 | 0.0001 | 0.042 | 0.196 | 0.00054 | 0.18 |
| | 29 | 0.00 | 0.01 | 0.0000 | 0.0003 | 0.002 | 0.001 | 0.003 | 0.0001 | 0.039 | 0.185 | 0.00038 | 0.12 |
| | 30 | 0.01 | 0.00 | 0.0003 | 0.0003 | 0.001 | 0.002 | 0.001 | 0.0002 | 0.042 | 0.196 | 0.00076 | 0.25 |
| | 31 | 0.02 | 0.00 | 0.0003 | 0.0001 | 0.000 | 0.003 | 0.003 | 0.0000 | 0.051 | 0.206 | 0.00072 | 0.24 |
| | 32 | 0.01 | 0.00 | 0.0000 | 0.0002 | 0.000 | 0.003 | 0.003 | 0.0003 | 0.038 | 0.193 | 0.00036 | 0.11 |
| | 33 | 0.02 | 0.00 | 0.0003 | 0.0000 | 0.003 | 0.002 | 0.002 | 0.0003 | 0.021 | 0.190 | 0.00058 | 0.18 |
| | 34 | 0.01 | 0.00 | 0.0001 | 0.0001 | 0.003 | 0.003 | 0.001 | 0.0002 | 0.038 | 0.192 | 0.00064 | 0.21 |

TABLE 2

| | | CHEMICAL COMPOSITION (mass %) | | | | | | | | | | | | | |
|---|---|---|---|---|---|---|---|---|---|---|---|---|---|---|---|
| | | C | Si | Mn | P | S | Ni | Al | Ti | Nb | N | B | O | Cu | V |
| COMPARATIVE STEEL | 35 | 0.027 | 0.18 | 2.30 | 0.004 | 0.003 | 0.09 | 0.002 | 0.011 | 0.001 | 0.0034 | 0.0007 | 0.0020 | 0.00 | 0.000 |
| | 36 | 0.044 | 0.11 | 1.89 | 0.004 | 0.002 | 0.41 | 0.002 | 0.016 | 0.000 | 0.0031 | 0.0006 | 0.0022 | 0.00 | 0.000 |
| | 37 | 0.039 | 0.06 | 2.56 | 0.005 | 0.003 | 0.43 | 0.002 | 0.010 | 0.001 | 0.0033 | 0.0007 | 0.0019 | 0.00 | 0.000 |
| | 38 | 0.047 | 0.09 | 1.76 | 0.004 | 0.003 | 0.40 | 0.002 | 0.012 | 0.002 | 0.0036 | 0.0015 | 0.0023 | 0.00 | 0.000 |
| | 39 | 0.032 | 0.10 | 1.96 | 0.004 | 0.003 | 0.46 | 0.003 | 0.010 | 0.002 | 0.0029 | 0.0006 | 0.0037 | 0.00 | 0.000 |
| | 40 | 0.040 | 0.19 | 1.99 | 0.004 | 0.002 | 0.56 | 0.002 | 0.011 | 0.001 | 0.0032 | 0.0006 | 0.0023 | 0.00 | 0.020 |
| | 41 | 0.041 | 0.10 | 1.88 | 0.005 | 0.003 | 0.43 | 0.002 | 0.009 | 0.001 | 0.0032 | 0.0016 | 0.0019 | 0.00 | 0.000 |
| | 42 | 0.032 | 0.15 | 1.75 | 0.005 | 0.003 | 0.20 | 0.002 | 0.012 | 0.001 | 0.0036 | 0.0007 | 0.0023 | 0.60 | 0.000 |
| | 43 | 0.039 | 0.22 | 1.82 | 0.004 | 0.003 | 0.42 | 0.002 | 0.011 | 0.002 | 0.0030 | 0.0006 | 0.0025 | 0.00 | 0.000 |
| | 44 | 0.032 | 0.12 | 1.85 | 0.004 | 0.003 | 0.40 | 0.002 | 0.020 | 0.001 | 0.0033 | 0.0005 | 0.0018 | 0.00 | 0.000 |
| | 45 | 0.042 | 0.14 | 2.01 | 0.004 | 0.004 | 0.44 | 0.002 | 0.013 | 0.003 | 0.0041 | 0.0002 | 0.0021 | 0.00 | 0.000 |
| | 46 | 0.032 | 0.12 | 1.83 | 0.003 | 0.003 | 0.43 | 0.002 | 0.011 | 0.002 | 0.0036 | 0.0007 | 0.0023 | 0.00 | 0.026 |
| | 47 | 0.031 | 0.09 | 1.54 | 0.004 | 0.003 | 0.47 | 0.002 | 0.011 | 0.001 | 0.0036 | 0.0008 | 0.0024 | 0.00 | 0.000 |
| | 48 | 0.040 | 0.10 | 2.10 | 0.004 | 0.003 | 0.52 | 0.002 | 0.010 | 0.002 | 0.0030 | 0.0006 | 0.0022 | 0.25 | 0.020 |
| | 49 | 0.033 | 0.12 | 1.87 | 0.005 | 0.002 | 0.46 | 0.002 | 0.012 | 0.002 | 0.0032 | 0.0018 | 0.0026 | 0.00 | 0.000 |
| | 50 | 0.042 | 0.08 | 1.95 | 0.004 | 0.003 | 0.43 | 0.002 | 0.004 | 0.001 | 0.0035 | 0.0006 | 0.0018 | 0.00 | 0.000 |
| | 51 | 0.031 | 0.13 | 1.84 | 0.004 | 0.003 | 0.41 | 0.002 | 0.008 | 0.002 | 0.0066 | 0.0004 | 0.0023 | 0.00 | 0.000 |
| | 52 | 0.043 | 0.15 | 1.71 | 0.005 | 0.003 | 0.44 | 0.005 | 0.011 | 0.001 | 0.0036 | 0.0007 | 0.0024 | 0.00 | 0.000 |
| | 53 | 0.041 | 0.14 | 1.85 | 0.004 | 0.003 | 0.45 | 0.002 | 0.011 | 0.005 | 0.0032 | 0.0008 | 0.0021 | 0.00 | 0.000 |
| | 54 | 0.044 | 0.13 | 1.88 | 0.003 | 0.002 | 0.43 | 0.002 | 0.010 | 0.002 | 0.0027 | 0.0011 | 0.0022 | 0.00 | 0.000 |
| | 55 | 0.034 | 0.12 | 1.84 | 0.004 | 0.003 | 0.45 | 0.002 | 0.009 | 0.001 | 0.0030 | 0.0009 | 0.0014 | 0.00 | 0.000 |

| | | CHEMICAL COMPOSITION (mass %) | | | | | | | | | | | |
|---|---|---|---|---|---|---|---|---|---|---|---|---|---|
| | | Cr | Mo | Ca | Mg | Sb | Sn | As | REM | $P_{CTOD}$ | $C_{eqH}$ | FB | Bp |
| COMPARATIVE STEEL | 35 | 0.00 | 0.00 | 0.0000 | 0.0000 | 0.001 | 0.001 | 0.001 | 0.0001 | 0.028 | 0.225 | 0.00044 | 0.14 |
| | 36 | 0.01 | 0.00 | 0.0001 | 0.0000 | 0.003 | 0.001 | 0.000 | 0.0001 | 0.050 | 0.201 | 0.00060 | 0.20 |

TABLE 2-continued

| Steel | | | | | | | | | | | | |
|---|---|---|---|---|---|---|---|---|---|---|---|---|
| 37 | 0.02 | 0.00 | 0.0003 | 0.0003 | 0.002 | 0.002 | 0.001 | 0.0003 | 0.045 | 0.229 | 0.00034 | 0.11 |
| 38 | 0.01 | 0.00 | 0.0002 | 0.0003 | 0.001 | 0.001 | 0.002 | 0.0003 | 0.053 | 0.191 | 0.00118 | 0.39 |
| 39 | 0.00 | 0.00 | 0.0000 | 0.0002 | 0.002 | 0.002 | 0.003 | 0.0002 | 0.039 | 0.192 | 0 | 0.00 |
| 40 | 0.02 | 0.00 | 0.0003 | 0.0001 | 0.001 | 0.001 | 0.003 | 0.0001 | 0.055 | 0.236 | 0.00036 | 0.12 |
| 41 | 0.01 | 0.01 | 0.0003 | 0.0003 | 0.000 | 0.001 | 0.002 | 0.0002 | 0.047 | 0.195 | 0.00109 | 0.36 |
| 42 | 0.02 | 0.00 | 0.0001 | 0.0003 | 0.003 | 0.002 | 0.003 | 0.0002 | 0.062 | 0.234 | 0.00038 | 0.12 |
| 43 | 0.02 | 0.00 | 0.0003 | 0.0001 | 0.002 | 0.001 | 0.001 | 0.0001 | 0.045 | 0.218 | 0.00042 | 0.14 |
| 44 | 0.01 | 0.00 | 0.0002 | 0.0003 | 0.001 | 0.002 | 0.003 | 0.0002 | 0.038 | 0.189 | 0.00050 | 0.16 |
| 45 | 0.00 | 0.00 | 0.0000 | 0.0002 | 0.002 | 0.003 | 0.002 | 0.0001 | 0.049 | 0.215 | 0 | 0.00 |
| 46 | 0.02 | 0.00 | 0.0001 | 0.0000 | 0.001 | 0.003 | 0.001 | 0.0000 | 0.047 | 0.202 | 0 | 0.00 |
| 47 | 0.02 | 0.00 | 0.0003 | 0.0003 | 0.003 | 0.002 | 0.002 | 0.0003 | 0.038 | 0.160 | 0.00021 | 0.07 |
| 48 | 0.01 | 0.00 | 0.0002 | 0.0001 | 0.002 | 0.003 | 0.000 | 0.0002 | 0.066 | 0.240 | 0.00034 | 0.11 |
| 49 | 0.00 | 0.00 | 0.0000 | 0.0000 | 0.001 | 0.001 | 0.003 | 0.0003 | 0.040 | 0.192 | 0.00165 | 0.53 |
| 50 | 0.02 | 0.00 | 0.0003 | 0.0003 | 0.002 | 0.000 | 0.003 | 0.0001 | 0.048 | 0.196 | 0 | 0.00 |
| 51 | 0.01 | 0.01 | 0.0003 | 0.0001 | 0.001 | 0.003 | 0.002 | 0.0003 | 0.037 | 0.190 | 0 | 0.00 |
| 52 | 0.02 | 0.00 | 0.0002 | 0.0003 | 0.003 | 0.003 | 0.001 | 0.0001 | 0.050 | 0.198 | 0.00038 | 0.13 |
| 53 | 0.01 | 0.00 | 0.0003 | 0.0002 | 0.002 | 0.002 | 0.002 | 0.0000 | 0.048 | 0.203 | 0.00065 | 0.21 |
| 54 | 0.02 | 0.00 | 0.0002 | 0.0000 | 0.003 | 0.001 | 0.002 | 0.0003 | 0.050 | 0.206 | 0.00107 | 0.35 |
| 55 | 0.02 | 0.00 | 0.0003 | 0.0003 | 0.002 | 0.002 | 0.000 | 0.0003 | 0.041 | 0.191 | 0.00060 | 0.19 |

TABLE 3

| | | PRODUCTION CONDITIONS | | | | BASE METAL PROPERTIES | | NUMBER OF OXIDE |
|---|---|---|---|---|---|---|---|---|
| STEEL | THICK-NESS (mm) | COOLING RATE OF SLAB (° C./min) | REHEATING TEMPERATURE (° C.) | THERMO-MECHANICAL TREATMENT METHOD | CUMULATIVE ROLLING REDUCTION (%) IN NON-CRYSTALLIZATION TEMPERATURE RANGE | YS (N/mm²) | TS (N/mm²) | PARTICLES HAVING EQUIVALENT CIRCLE DIAMETER OF 2 μm OR GREATER (PARTICLES/mm²) |
| 1 | 60 | 12 | 1000 | ACC | 50 | 472 | 537 | 8 |
| 2 | 40 | 13 | 1050 | ACC + T | 50 | 421 | 501 | 10 |
| 3 | 40 | 11 | 1050 | ACC + T | 40 | 424 | 505 | 12 |
| 4 | 40 | 14 | 1080 | ACC | 45 | 429 | 488 | 10 |
| 5 | 45 | 12 | 1100 | ACC + T | 40 | 449 | 534 | 9 |
| 6 | 35 | 11 | 1080 | ACC | 40 | 422 | 480 | 10 |
| 7 | 40 | 12 | 1050 | ACC | 40 | 431 | 490 | 11 |
| 8 | 30 | 13 | 1080 | ACC | 40 | 421 | 481 | 14 |
| 9 | 40 | 15 | 1050 | ACC | 40 | 422 | 480 | 12 |
| 10 | 35 | 12 | 1100 | CR | 55 | 425 | 545 | 10 |
| 11 | 40 | 11 | 1050 | ACC | 45 | 429 | 488 | 13 |
| 12 | 45 | 13 | 1080 | ACC + T | 50 | 434 | 517 | 10 |
| 13 | 50 | 15 | 950 | ACC + T | 50 | 432 | 514 | 13 |
| 14 | 35 | 12 | 1030 | ACC | 35 | 423 | 481 | 11 |
| 15 | 40 | 10 | 1060 | ACC + T | 40 | 422 | 503 | 16 |
| 16 | 35 | 13 | 1050 | ACC | 40 | 424 | 482 | 14 |
| 17 | 40 | 12 | 1080 | CR | 40 | 421 | 540 | 12 |
| 18 | 40 | 11 | 1050 | ACC | 40 | 420 | 480 | 11 |
| 19 | 35 | 12 | 1050 | ACC | 45 | 423 | 481 | 10 |
| 20 | 35 | 14 | 1080 | CR | 55 | 452 | 579 | 12 |
| 21 | 35 | 12 | 1060 | ACC + T | 40 | 420 | 500 | 10 |
| 22 | 40 | 11 | 1050 | ACC | 40 | 425 | 483 | 12 |
| 23 | 60 | 12 | 1000 | ACC | 50 | 468 | 530 | 9 |
| 24 | 35 | 13 | 1100 | CR | 55 | 427 | 549 | 10 |
| 25 | 45 | 11 | 1080 | ACC + T | 50 | 436 | 519 | 9 |
| 26 | 40 | 14 | 1050 | ACC | 45 | 431 | 493 | 11 |
| 27 | 30 | 12 | 1050 | ACC | 40 | 427 | 495 | 13 |
| 28 | 40 | 11 | 1000 | ACC | 40 | 432 | 492 | 12 |
| 29 | 35 | 13 | 1050 | ACC | 45 | 422 | 483 | 10 |
| 30 | 45 | 12 | 1050 | ACC | 40 | 431 | 490 | 12 |
| 31 | 45 | 14 | 1000 | ACC | 45 | 434 | 489 | 11 |
| 32 | 40 | 12 | 1050 | ACC | 40 | 425 | 485 | 13 |
| 33 | 35 | 11 | 1050 | ACC | 40 | 425 | 492 | 11 |

TABLE 3-continued

| STEEL | BASE METAL PROPERTIES NUMBER OF TI OXIDE PARTICLES HAVING EQUIVALENT CIRCLE DIAMETER OF 0.05 μm TO 0.5 μm (PARTICLES/mm²) | CTOD PROPERTIES OF WELDED JOINT(−80° C.) | | | | IGF FRACTION (%) OF FL ZONE OF WELDED JOINT | |
|---|---|---|---|---|---|---|---|
| | | FL NOTCH | | IC NOTCH | | | |
| | | δ cave. (mm) | δ cmin. (mm) | δ cave. (mm) | δ cmin. (mm) | | |
| 1 | 7.2 × 10³ | 0.65 | 0.50 | 0.79 | 0.63 | 95 | EXAMPLE ACCORDING TO PRESENT INVENTION |
| 2 | 1.3 × 10⁴ | 0.51 | 0.39 | 0.84 | 0.68 | 93 | EXAMPLE ACCORDING TO PRESENT INVENTION |
| 3 | 7.0 × 10³ | 0.53 | 0.41 | 0.82 | 0.66 | 93 | EXAMPLE ACCORDING TO PRESENT INVENTION |
| 4 | 1.8 × 10⁴ | 0.46 | 0.36 | 0.84 | 0.68 | 91 | EXAMPLE ACCORDING TO PRESENT INVENTION |
| 5 | 6.8 × 10³ | 0.51 | 0.39 | 0.83 | 0.67 | 92 | EXAMPLE ACCORDING TO PRESENT INVENTION |
| 6 | 6.5 × 10³ | 0.36 | 0.30 | 0.83 | 0.67 | 96 | EXAMPLE ACCORDING TO PRESENT INVENTION |
| 7 | 7.4 × 10³ | 0.40 | 0.33 | 0.82 | 0.66 | 95 | EXAMPLE ACCORDING TO PRESENT INVENTION |
| 8 | 1.2 × 10⁴ | 0.52 | 0.39 | 0.85 | 0.69 | 92 | EXAMPLE ACCORDING TO PRESENT INVENTION |
| 9 | 1.9 × 10⁴ | 0.77 | 0.56 | 0.83 | 0.67 | 94 | EXAMPLE ACCORDING TO PRESENT INVENTION |
| 10 | 6.9 × 10³ | 0.56 | 0.41 | 0.85 | 0.69 | 95 | EXAMPLE ACCORDING TO PRESENT INVENTION |
| 11 | 6.6 × 10³ | 0.48 | 0.38 | 0.81 | 0.65 | 95 | EXAMPLE ACCORDING TO PRESENT INVENTION |
| 12 | 1.1 × 10⁴ | 0.55 | 0.41 | 0.83 | 0.67 | 96 | EXAMPLE ACCORDING TO PRESENT INVENTION |
| 13 | 1.9 × 10⁴ | 0.49 | 0.38 | 0.82 | 0.66 | 93 | EXAMPLE ACCORDING TO PRESENT INVENTION |
| 14 | 8.1 × 10³ | 0.53 | 0.41 | 0.83 | 0.67 | 95 | EXAMPLE ACCORDING TO PRESENT INVENTION |
| 15 | 3.6 × 10³ | 0.62 | 0.46 | 0.83 | 0.67 | 96 | EXAMPLE ACCORDING TO PRESENT INVENTION |
| 16 | 1.3 × 10⁴ | 0.64 | 0.48 | 0.82 | 0.67 | 94 | EXAMPLE ACCORDING TO PRESENT INVENTION |
| 17 | 7.4 × 10³ | 0.54 | 0.40 | 0.84 | 0.68 | 93 | EXAMPLE ACCORDING TO PRESENT INVENTION |
| 18 | 7.2 × 10³ | 0.56 | 0.42 | 0.83 | 0.67 | 93 | EXAMPLE ACCORDING TO PRESENT INVENTION |
| 19 | 7.0 × 10³ | 0.54 | 0.40 | 0.86 | 0.70 | 96 | EXAMPLE ACCORDING TO PRESENT INVENTION |
| 20 | 1.5 × 10⁴ | 0.50 | 0.40 | 0.80 | 0.65 | 95 | EXAMPLE ACCORDING TO PRESENT INVENTION |
| 21 | 7.6 × 10³ | 0.56 | 0.41 | 0.85 | 0.69 | 91 | EXAMPLE ACCORDING TO PRESENT INVENTION |
| 22 | 7.3 × 10³ | 0.47 | 0.37 | 0.82 | 0.66 | 94 | EXAMPLE ACCORDING TO PRESENT INVENTION |
| 23 | 7.4 × 10³ | 0.62 | 0.51 | 0.75 | 0.65 | 95 | EXAMPLE ACCORDING TO PRESENT INVENTION |
| 24 | 7.0 × 10³ | 0.54 | 0.45 | 0.81 | 0.70 | 94 | EXAMPLE ACCORDING TO PRESENT INVENTION |
| 25 | 7.2 × 10³ | 0.58 | 0.43 | 0.83 | 0.69 | 95 | EXAMPLE ACCORDING TO PRESENT INVENTION |
| 26 | 7.3 × 10³ | 0.42 | 0.38 | 0.81 | 0.68 | 95 | EXAMPLE ACCORDING TO PRESENT INVENTION |
| 27 | 7.1 × 10³ | 0.53 | 0.42 | 0.80 | 0.69 | 94 | EXAMPLE ACCORDING TO PRESENT INVENTION |
| 28 | 7.4 × 10³ | 0.48 | 0.44 | 0.83 | 0.66 | 93 | EXAMPLE ACCORDING TO PRESENT INVENTION |
| 29 | 6.8 × 10³ | 0.51 | 0.48 | 0.82 | 0.67 | 91 | EXAMPLE ACCORDING TO PRESENT INVENTION |
| 30 | 6.9 × 10³ | 0.53 | 0.44 | 0.82 | 0.65 | 96 | EXAMPLE ACCORDING TO PRESENT INVENTION |
| 31 | 7.2 × 10³ | 0.49 | 0.42 | 0.84 | 0.68 | 95 | EXAMPLE ACCORDING TO PRESENT INVENTION |
| 32 | 7.0 × 10³ | 0.45 | 0.40 | 0.82 | 0.69 | 90 | EXAMPLE ACCORDING TO PRESENT INVENTION |
| 33 | 7.1 × 10³ | 0.52 | 0.48 | 0.80 | 0.72 | 91 | EXAMPLE ACCORDING TO PRESENT INVENTION |

TABLE 4

| | PRODUCTION CONDITIONS | | | | BASE METAL PROPERTIES | | NUMBER OF OXIDE |
|---|---|---|---|---|---|---|---|
| STEEL | THICKNESS (mm) | COOLING RATE OF SLAB (° C./min) | REHEATING TEMPERATURE (° C.) | THERMO-MECHANICAL TREATMENT METHOD | CUMULATIVE ROLLING REDUCTION (%) IN NON-CRYSTALLIZATION TEMPERATURE RANGE | YS (N/mm²) | TS (N/mm²) | PARTICLES HAVING EQUIVALENT CIRCLE DIAMETER OF 2 μm OR GREATER (PARTICLES/m²) |
| 34 | 40 | 4 | 1100 | ACC | 40 | 428 | 490 | <u>25</u> |
| 35 | 50 | 11 | 1050 | ACC | 50 | 459 | 522 | <u>10</u> |
| 36 | 40 | 12 | 1100 | ACC | 40 | 430 | 489 | 13 |
| 37 | 50 | 11 | 1050 | ACC | 40 | 451 | 513 | 11 |
| 38 | 40 | 14 | 1100 | ACC | 40 | 408 | 464 | 12 |
| 39 | 40 | 12 | 1100 | ACC + T | 50 | 441 | 525 | <u>22</u> |
| 40 | 45 | 12 | 1080 | ACC | 45 | 452 | 513 | 12 |
| 41 | 35 | 13 | 1080 | ACC | 45 | 419 | 476 | 11 |
| 42 | 35 | 12 | 1030 | ACC + T | 50 | 399 | 475 | 13 |
| 43 | 40 | 11 | 1100 | ACC | 40 | 412 | 482 | 14 |
| 44 | 35 | 12 | 1100 | ACC | 40 | 408 | 464 | 12 |
| 45 | 40 | 10 | 1060 | ACC | 45 | 436 | 496 | 17 |
| 46 | 35 | 13 | 1080 | ACC | 40 | 405 | 475 | 10 |
| 47 | 30 | 12 | 1100 | ACC | 40 | 389 | 469 | 12 |
| 48 | 50 | 10 | 1100 | ACC | 45 | 497 | 565 | 19 |
| 49 | 40 | 14 | 1100 | ACC | 40 | 418 | 474 | 13 |
| 50 | 45 | 12 | 1080 | CR | 50 | 429 | 505 | 11 |
| 51 | 35 | 11 | 1080 | ACC | 40 | 398 | 487 | 14 |
| 52 | 35 | 10 | 1100 | ACC | 40 | 397 | 451 | 19 |
| 53 | 35 | 13 | 1100 | ACC | 40 | 423 | 480 | 12 |

TABLE 4-continued

| 54 | 40 | 11 | 1050 | ACC | 45 | 410 | 496 | 11 |
| 55 | 35 | 12 | 1050 | ACC | 40 | 423 | 490 | 12 |

| STEEL | BASE METAL PROPERTIES NUMBER OF TI OXIDE PARTICLES HAVING EQUIVALENT CIRCLE DIAMETER OF 0.05 μm TO 0.5 μm (PARTICLES/m²) | CTOD PROPERTIES OF WELDED JOINT(−80° C.) | | | | IGF FRACTION (%) OF FL ZONE OF WELDED JOINT | |
|---|---|---|---|---|---|---|---|
| | | FL NOTCH | | IC NOTCH | | | |
| | | δ cave. (mm) | δ cmin. (mm) | δ cave. (mm) | δ cmin. (mm) | | |
| 34 | 1.0 × 10² | 0.08 | 0.06 | 0.29 | 0.26 | 84 | EXAMPLE ACCORDING TO PRESENT INVENTION |
| 35 | 7.0 × 10⁵ | 0.21 | 0.19 | 0.20 | 0.18 | 93 | EXAMPLE ACCORDING TO PRESENT INVENTION |
| 36 | 7.7 × 10³ | 0.04 | 0.02 | 0.52 | 0.41 | 92 | EXAMPLE ACCORDING TO PRESENT INVENTION |
| 37 | 7.1 × 10³ | 0.06 | 0.03 | 0.08 | 0.05 | 94 | EXAMPLE ACCORDING TO PRESENT INVENTION |
| 38 | 1.3 × 10⁴ | 0.04 | 0.01 | 0.51 | 0.41 | 91 | EXAMPLE ACCORDING TO PRESENT INVENTION |
| 39 | 7.1 × 10³ | 0.03 | 0.01 | 0.69 | 0.21 | 81 | EXAMPLE ACCORDING TO PRESENT INVENTION |
| 40 | 7.3 × 10³ | 0.29 | 0.27 | 0.05 | 0.02 | 90 | EXAMPLE ACCORDING TO PRESENT INVENTION |
| 41 | 1.2 × 10⁴ | 0.05 | 0.02 | 0.31 | 0.26 | 94 | EXAMPLE ACCORDING TO PRESENT INVENTION |
| 42 | 7.7 × 10³ | 0.08 | 0.04 | 0.07 | 0.05 | 91 | EXAMPLE ACCORDING TO PRESENT INVENTION |
| 43 | 7.4 × 10³ | 0.07 | 0.02 | 0.44 | 0.34 | 92 | EXAMPLE ACCORDING TO PRESENT INVENTION |
| 44 | 7.2 × 10³ | 0.09 | 0.03 | 0.29 | 0.26 | 93 | EXAMPLE ACCORDING TO PRESENT INVENTION |
| 45 | 6.5 × 10³ | 0.04 | 0.01 | 0.66 | 0.53 | 83 | EXAMPLE ACCORDING TO PRESENT INVENTION |
| 46 | 1.1 × 10⁴ | 0.03 | 0.01 | 0.58 | 0.46 | 82 | EXAMPLE ACCORDING TO PRESENT INVENTION |
| 47 | 7.0 × 10³ | 0.09 | 0.06 | 0.63 | 0.50 | 85 | EXAMPLE ACCORDING TO PRESENT INVENTION |
| 48 | 3.1 × 10³ | 0.03 | 0.01 | 0.06 | 0.02 | 91 | EXAMPLE ACCORDING TO PRESENT INVENTION |
| 49 | 1.6 × 10⁴ | 0.02 | 0.01 | 0.35 | 0.27 | 95 | EXAMPLE ACCORDING TO PRESENT INVENTION |
| 50 | 7.5 × 10³ | 0.04 | 0.01 | 0.58 | 0.46 | 83 | EXAMPLE ACCORDING TO PRESENT INVENTION |
| 51 | 6.9 × 10³ | 0.04 | 0.02 | 0.29 | 0.24 | 81 | EXAMPLE ACCORDING TO PRESENT INVENTION |
| 52 | 1.1 × 10² | 0.02 | 0.01 | 0.55 | 0.44 | 64 | EXAMPLE ACCORDING TO PRESENT INVENTION |
| 53 | 7.6 × 10⁴ | 0.09 | 0.06 | 0.32 | 0.25 | 93 | EXAMPLE ACCORDING TO PRESENT INVENTION |
| 54 | 6.8 × 10³ | 0.06 | 0.03 | 0.46 | 0.37 | 93 | EXAMPLE ACCORDING TO PRESENT INVENTION |
| 55 | 1.2 × 10² | 0.08 | 0.06 | 0.36 | 0.31 | 62 | EXAMPLE ACCORDING TO PRESENT INVENTION |

INDUSTRIAL APPLICABILITY

According to the aspect of the present invention, a high-strength steel for welding having high CTOD properties of the FL and the IC zone during multi-layer welding of small to medium heat input can be obtained.

The invention claimed is:

1. A steel for welding comprising, as steel components, by mass %,
C: a content [C] of 0.015% to 0.045%,
Si: a content [Si] of 0.05% to 0.20%,
Mn: a content [Mn] of 1.7% to 2.02%,
Ni: a content [Ni] of 0.1% to 0.52%,
Ti: a content [Ti] of 0.005% to 0.015%,
B: a content [B] of 0.0003% to 0.0015%,
N: a content [N] of 0.002% to 0.006%,
O: a content [O] of 0.0015% to 0.0035%,
P: a content [P] limited to 0.008% or less,
S: a content [S] limited to 0.005% or less,
Al: a content [Al] limited to 0.004% or less,
Nb: a content [Nb] limited to 0.004% or less,
Cu: a content [Cu] limited to 0.03% or less,
V: a content [V] limited to 0.02% or less, and
a balance consisting of Fe and unavoidable impurities,
wherein:
$P_{CTOD}$ in a following equation 1 is less than or equal to 0.065%,
CeqH in a following equation 2 is less than or equal to 0.225%,
FB in a following equation 3 is greater than or equal to 0.0003%, and
Bp in a following equation 4 is 0.09% to 0.30%,
wherein in a thickness center portion of a cross-section in a thickness direction, the number of oxide particles having an equivalent circle diameter of 2 μm or greater is less than or equal to 20 particles/mm²,
wherein the number of Ti oxides having an equivalent circle diameter of 0.05 μm to 0.5 μm is $1.0 \times 10^3$ particles/mm² to $1.0 \times 10^5$ particles/mm², and
wherein:

$$P_{CTOD}=[C]+[Cu]/22+[Ni]/67+[V]/3 \quad \text{Equation 1}$$

$$CeqH=[C]+[Si]/4.16+[Mn]/14.9+[Cu]/12.9+[Ni]/105+[V]/1.82 \quad \text{Equation 2}$$

$$FB=[B]-0.77\times([N]-0.29\times([Ti]-2\times([O]-0.89\times[Al]))) \quad \text{Equation 3; and}$$

$$Bp=(884\times[C]\times(1-0.3\times[C]^2)+294)\times FB \quad \text{Equation 4;}$$

wherein:
0 is substituted for ([O]−0.89×[Al]) in the Equation 3 when ([O]−0.89×[Al]) is 0 or less;
0 is substituted for ([Ti]−2×([O]−0.89×[Al])) in the Equation 3 when ([Ti]−2×([O]−0.89×[Al])) is 0 or less;
0 is substituted for ([N]−0.29×([Ti]−2×([O]−0.89×[Al]))) in the Equation 3 when ([N]−0.29×([Ti]−2×([O]−0.89×[Al]))) is 0 or less; and
0 is substituted for FB in the Equation 4 when FB is 0 or less.

2. The steel for welding according to claim 1, wherein the B content [B] is 0.0006% to 0.0015%.

3. The steel for welding according to claim 1, wherein the Mn content [Mn] is 1.8% to 2.02%.

4. The steel for welding according to claim 1, wherein the Mn content [Mn] is 1.9% to 2.02%.

5. The steel for welding according to claim 1, wherein the C content [C] is 0.015% to 0.039%.
6. The steel for welding according to claim 1, wherein the C content [C] is 0.015% to 0.035%.
7. The steel for welding according to claim 1, wherein the O content [O] is 0.0020% to 0.0035%.
8. The steel for welding according to claim 2, wherein the O content [O] is 0.0020% to 0.0035%.

* * * * *